United States Patent
Ishii (10) Patent No.: US 8,830,247 B2
(45) Date of Patent: Sep. 9, 2014

(54) IMAGE DISPLAYING DEVICE HAVING IMAGE CACHE MEMORY

(75) Inventor: Eisaku Ishii, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 2267 days.

(21) Appl. No.: 11/802,535

(22) Filed: May 23, 2007

(65) Prior Publication Data

US 2007/0273702 A1    Nov. 29, 2007

(30) Foreign Application Priority Data

May 24, 2006 (JP) .................................. 2006-144165

(51) Int. Cl.
- G09G 5/36 (2006.01)
- G06T 1/60 (2006.01)
- G06T 9/00 (2006.01)
- G06F 12/08 (2006.01)
- G09G 5/393 (2006.01)
- G06F 3/14 (2006.01)

(52) U.S. Cl.
CPC ...... G06F 12/0875 (2013.01); G09G 2360/121 (2013.01); G09G 5/393 (2013.01); G06F 3/14 (2013.01)
USPC ............................ 345/557; 345/530; 345/555

(58) Field of Classification Search
USPC .......................... 345/530, 536, 537, 555, 557
See application file for complete search history.

(56) References Cited

U.S. PATENT DOCUMENTS

| | | | |
|---|---|---|---|
| 5,715,070 A * | 2/1998 | Tone et al. | 358/468 |
| 6,549,210 B1 | 4/2003 | Van Hook et al. | |
| 6,664,969 B1 * | 12/2003 | Emerson et al. | 345/544 |
| 6,898,329 B1 * | 5/2005 | Takahashi | 382/272 |
| 2005/0050028 A1 * | 3/2005 | Rose et al. | 707/3 |
| 2006/0077207 A1 | 4/2006 | O'Neill et al. | |

FOREIGN PATENT DOCUMENTS

| | | |
|---|---|---|
| JP | 6-289838 | 10/1994 |
| JP | 9-34791 | 2/1997 |
| JP | 9-185552 | 7/1997 |
| JP | 11-288418 | 10/1999 |
| JP | 2000-299829 | 10/2000 |
| JP | 2002-51022 | 2/2002 |

(Continued)

OTHER PUBLICATIONS

Japanese Office Action dated May 7, 2008 with a partial English translation.

(Continued)

Primary Examiner — Joni Richer
(74) Attorney, Agent, or Firm — McGinn IP Law Group, PLLC (57) ABSTRACT

An image displaying device with an image cache data storage unit, including: an image cache identifier generating unit that obtains a hash value of a fixed length from sampling data of original image data and generates an image cache identifier unique to said original image data based on the hash value of a fixed length; an image cache searching unit that checks whether image cache data to which the generated image cache identifier is added is stored in said image cache memory or not; and an image cache generating unit that, when the image cache data has been not stored in said image cache memory, generates image cache data by adding the image cache identifier generated by said image cache identifier generating unit to the original image data and stores the image cache data in said image cache memory.

20 Claims, 4 Drawing Sheets

(56) References Cited

FOREIGN PATENT DOCUMENTS

| | | |
|---|---|---|
| JP | 2002-268935 | 9/2002 |
| JP | 2003-216465 | 7/2003 |
| JP | 2004-152172 | 5/2004 |
| JP | 2005-166168 | 6/2005 |

OTHER PUBLICATIONS

Extended European Patent Office Search Report dated Jul. 28, 2009.

* cited by examiner

IMAGE DISPLAYING DEVICE HAVING IMAGE CACHE MEMORY

This application is based upon and claims the benefit of priority from Japanese Patent Application No. 2006-144165 filed in Japan Patent Office on May 24, 2006, the contents of which are hereby incorporated by reference.

BACKGROUND OF THE INVENTION (1) Field of the Invention

The present invention relates to an image displaying device having an image cache memory.

(2) Description of the Related Art

An approach of keeping an image that is once displayed or a zoomed-down image (thumbnail image) in memory as cache data for reducing a time for waiting for an image to be displayed has been known.

Japanese Patent Laid-Open Application No. 2004-152172 describes an information processing device provided with RAM (Random Access Memory) or card memory as image cache memory for saving cache data. The information processing device uses, as identifier for associating original image data with cache data, information indicating a location for storing an image such as an image file name or information on date and time of creation or date and time of update. If the cache data of an image data to be displayed is in image cache memory, it executes image display using the cache data. If the cache data of an image data to be displayed is not in the image cache memory, it executes display using the original image data.

Generally, image cache memory takes up a smaller space than that of main memory in which the original image data is stored and is limited to the amount of cache data to store. Therefore, it is preferable to avoid storing unwanted cache data in the image cache memory so that desired cache data can be effectively stored in image cache memory.

In the information processing device described in Japanese Patent Laid-Open 2004-152172, information that indicates a location storing an image such as an image file name or information on date and time of creation or date and time of update is employed as an identifier for associating original image data with cache data. In such a manner, if the same original image data is stored as different file names, cache data will be saved for each of original image data stored with different file names. It is not preferred that a plurality of cache data are saved for the same original image data from the viewpoint of effectively storing cache data.

Recently, an image displaying system in which a plurality of image transmitting devices are connected with an image displaying device via a network is known. As this type of image displaying system, a presentation system is known, for example. In the presentation system, the image transmitting device transmits a real-time image that is played by the presentation application software (for example, the program that captured a display image) on the image displaying device and the image displaying device displays the real-time image received from the image transmitting device. In such a case, the real-time image is often given a name indicating a storage (playing) location for convenience. If the same real-time image is transmitted from different image transmitting devices to the image displaying device, the image displaying device generates cache data for each of real-time images received from the image transmitting devices. Therefore, the image displaying device cannot store cache data effectively.

A method, in which the entire image data is used to a hash value of a fixed length based on a hash function as an identifier is inherent in an image data. If an identifier for cache data is generated by this method, the determination of whether each piece of generated cache data is created from the same original image data or not can be performed based on the identifier. In such a case, however, the entire original image data is used to create the identifier for cache data. Accordingly, when the image size of the original image data is large, much time is spent reading the original image data. In addition, since the amount of calculation of the hash values increases, calculation requires a lot of time.

SUMMARY OF THE INVENTION

An object of the present invention is to solve the above mentioned problems and to provide an image displaying device that can use image cache memory efficiently.

For the purpose of achieving the object, the image displaying device of the present invention is an image displaying device having an image cache memory, comprising:

an image displaying unit that performs a process for displaying supplied image data;

an image cache identifier generating unit that obtains a hash value of a fixed length from sampling data of original image data and generates an image cache identifier unique to said original image data based on the hash value of a fixed length;

an image cache searching unit that, when the image cache identifier is generated by said image cache identifier generating unit, checks whether image cache data to which the image cache identifier is added is stored in said image cache memory or not, and that reads the image cache data from said image cache memory when the image cache data is stored and supplies the read image cache data for said image displaying unit; and an image cache generating unit that, when said image cache searching unit determines that the image cache data has not been stored in said image cache memory, supplies the original image data for said image displaying unit, and that generates image cache data by adding the image cache identifier generated by said image cache identifier generating unit to the original image data and stores the image cache data in said image cache memory.

According to the image displaying device, a hash value of a fixed length that is obtained from sampling data of the original image data is used as an image cache identifier that associates the original image data with the image cache data. Since the image cache identifier using the hash value of a fixed length is unique to the original image data, if a plurality of pieces of the same original image data are present, the same image cache identifier is generated from each piece of original image data.

Only when the image cache data, to which the same image cache identifier as that obtained from the original image data is added, is not stored in the image cache memory for the original image data to be displayed, will the image cache generating unit generate an image cache with the image cache identifier added and store it in the image cache memory. Therefore, a plurality of pieces of image cache data with the same image cache identifier are not stored in the image cache data. Thus, a problem in that a piece of cache data is saved for each of the same original image data stored under a different file name does not occur in the case where the same original image data is stored under different file names.

Since the image displaying device is adapted to obtain a hash value of a fixed length from sampling data of the original image data, it requires time for reading the original image data and calculating the hash value which is shorter than that required by conventional methods which use all image data to determine a hash value of a fixed length using a hash function.

The image displaying system of the present invention includes:

an image displaying device having an image cache memory; and at least one image transmitting device that communicates with said image displaying device mutually, wherein said image transmitting device includes an image cache processing unit that obtains a hash value of a fixed length from sampling data of original image data, generates an image cache identifier unique to said original image data based on the hash value of a fixed length and transmits the image cache identifier to said image displaying device; and said image displaying device comprises:

an image displaying unit that performs a process for displaying supplied image data;

an image cache searching unit that receives the image cache identifier from said image transmitting device and checks whether image cache data, to which the received image cache identifier is added, is stored in said image cache memory or not; and an image cache generating unit that, when said image cache searching unit determines that the image cache data has not been stored in said image cache memory, obtains the original image data from said image transmitting device and supplies the obtained original image data for said image displaying unit, wherein said image cache searching unit reads the image cache data from said image cache memory when the image cache data has been stored in said image cache memory and supplies the read image cache data for said image displaying unit; and wherein said image cache generating unit generates image cache data by adding the image cache identifier received from said image transmitting device to the obtained original image data and stores the image cache data in said image cache memory.

In the image displaying system, a plurality of pieces of image cache data with the same image cache identifier added are not stored in the image cache memory in common with the image displaying device of the present invention. Therefore, a problem, in that if different image transmitting devices transmit the same real-time image (original image data), pieces of cache data of the same real-time image (original image data) from respective image transmitting devices are generated by the image displaying device, does not occur.

Since the image displaying device is adapted to obtain a hash value of a fixed value from sampling data of the original image data, the amount of time that is required to read the original image data and to calculate the hash value is as short as that in the abovementioned image displaying device of the present invention.

According to the present invention, a plurality of pieces of cache data are not created from the same original image data, thus, image cache memory can be effectively used.

In addition, the time for reading the original image data and for calculating a hash value is shorter than that in the case where an image cache identifier is generated by using the entire original image data. Thus, a time for generating an image cache identifier can be shortened by that reduced time period.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 1:
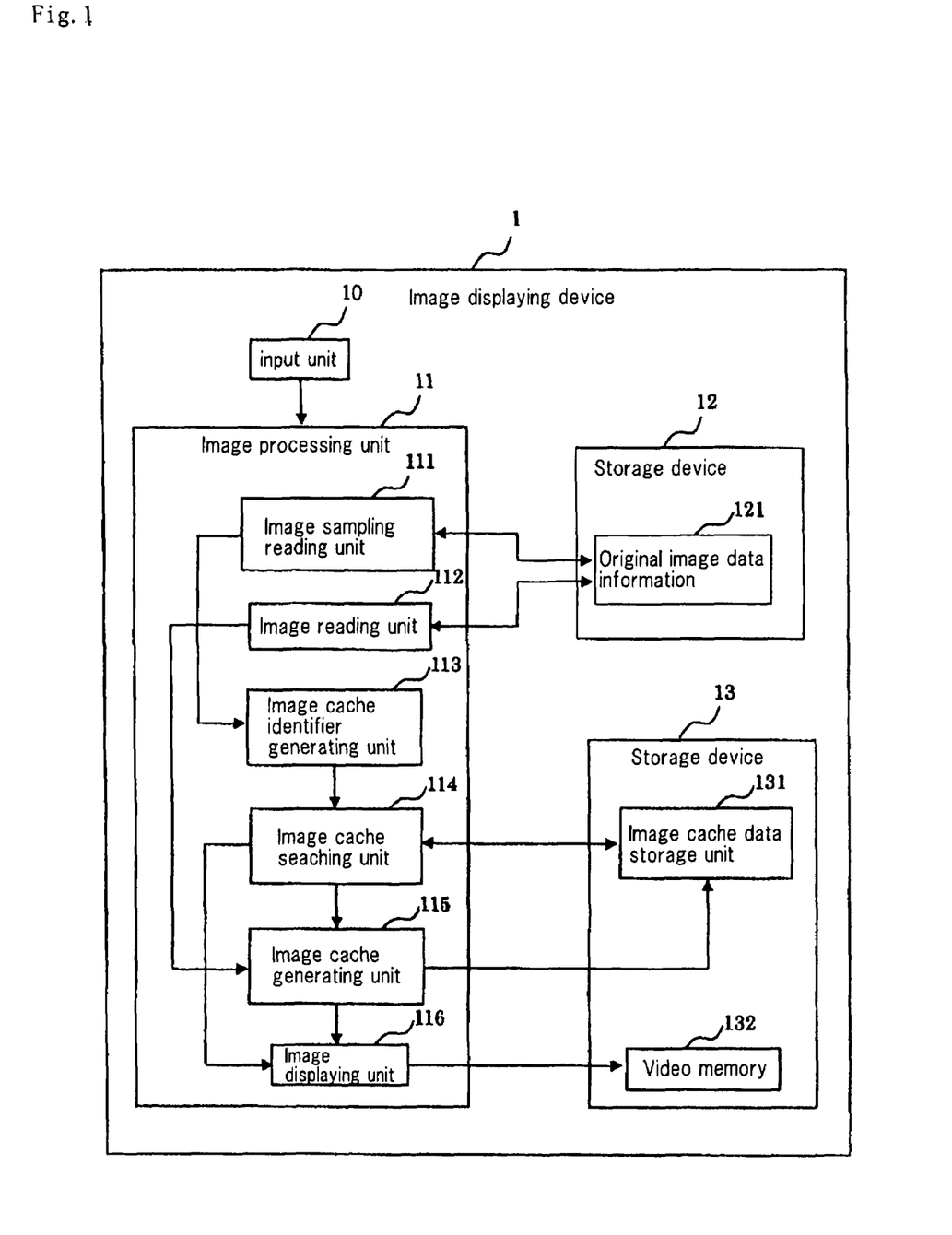
FIG. 1 is a block diagram showing an outlined configuration of an image displaying device of an embodiment of the present invention.

FIG. 1 is a block diagram showing an outlined configuration of an image displaying device of an embodiment of the present invention. Referring to FIG. 1, image displaying device 1 is a display such as a projector. The main part of image displaying device 1 includes input unit 10, image processing unit 11 and storage devices 12 and 13.

Storage device 12 is for storing original image data information 121. Original image data information 121 includes original image data that is coded and compressed as represented by JPEG, for example, the size of the original image data and information that can identify the original image data.

For storage device 12, various types of storage devices, such as a storage medium represented by ROM (Read Only Memory), USB (Universal Serial Bus) memory, DVD (Digital Versatile Disk) and CD (Compact Disc), internal and external hard discs can be applied. Storage device 12 may be formed by an information storage part that is on an external information terminal (such as a server) connected to image displaying device 1 via a network.

Input unit 10 is a user interface for instructing operation of image displaying device 1 and inputting information, and includes a plurality of operation buttons. In order to display a desired original image data from original image data information 121 stored in storage device 12, an operator inputs information relating to the original image data (such as identifying information) to the display by using input unit 10. When instructions are input to display an image, information relating to the original image data that is to be displayed (such as identifying information) is supplied from input unit 10 to image processing unit 11.

Storage device 13 is formed by RAM (Random Access Memory) or VRAM (Video Random Access Memory), including image cache data storage unit 131 and video memory 132. Image cache data storage unit 131 stores image cache data. Video memory 132 is memory for keeping data to be displayed on a display (not shown). The data storage location in video memory 132 and the display position on the display are associated with each other.

Image processing unit 11 includes image sampling reading unit 111, image reading unit 112, image cache identifier generating 113, image cache searching 114, image cache generating unit 115 and image displaying unit 116.

Image sampling reading unit 111 determines the original image data that is to be displayed from original image data information 121 stored in storage device 12 based on the information relating to the original image data that is to be displayed (such as identifying information) supplied from input unit 10, samples the original image data at the sampling position, which depends on the data size of the original image data, and reads the sampling data. For example, in the event that ten pieces of 16 bytes of data are sampled and read from image data of image size "S", "10 pieces×16 bytes" of data whose starting position is the data sampling position P [P=N (S−15)/9{N−0, 1, 2, 3, . . . , 9}] are sampled from the image data so that the sampled data includes the first and the last piece of the image data. Image sampling reading unit 111 supplies the sampling data obtained from the original image data that is to be displayed to image cache identifier generating unit 113 with the size of the original image data.

In response to an original image data reading request, image reading unit 112 determines the original image data to be displayed from original image data information 121 stored in storage device 12 based on the information relating to the original image data (such as identifying information) to be displayed supplied from input unit 10, if cache data of the original image data to be displayed is not stored in storage device 13. Then, image reading unit 112 reads all the determined original image data from storage device 12 and supplies it to image cache generating unit 115.

Image cache identifier generating unit 113 generates a hash value of a fixed length (about 128 bits) by using a predetermined hash function from the sampling data of the original image data to be displayed that is supplied from image sampling reading unit 111, and generates an image cache identifier by adding a bit field, which indicates the image size of the original image data to be displayed, to the hash value. Here, information relating to the storage location of the original image data is not used as the image cache identifier.

Image cache searching unit 114 searches cache data in image cache data storage unit 131 based on an image cache identifier generated by image cache identifier generating unit 113. If the image cache data is found, image cache searching unit 114 supplies the found image cache data to image displaying unit 116, requesting that it be displayed. If the image cache data is not found, image cache searching unit 114 requests image reading unit 112 to read the original image data.

Image cache generating unit 115 decodes the original image data to be displayed, which is supplied from image reading unit 112, and generates image cache data by combining the decoded image data with the image cache identifier of the original image data to be displayed, which is generated by image cache identifier generating unit 113. Image cache generating unit 115 stores the generated image cache data in image cache data storage unit 131 in storage device 13. Image cache generating unit 115 supplies a newly generated image cache data to image displaying unit 116, requesting that the image be displayed.

In the process for storing the image cache data, when image cache data storage unit 131 has no available space to store the newly generated image cache data, image cache generating unit 115 deletes the unwanted image cache data (for example, cache data with the oldest date and time of use) from image cache data storage unit 131. After the unwanted image cache data has been deleted, image cache generating unit 115 stores the newly generated image cache data in the image cache data storage unit 131. The cache data to be deleted may be decided according to a generally used cache system method. If cache data with the oldest date and time of use is to be deleted, information including date and time of creation, date and time of use, and date and time of update is stored with the image cache data. Cache data With the oldest date and time of use can be determined based on those information.

Image displaying unit 116 writes the image data (image cache data from image cache searching part 114 or the image cache generating part 115), for which a request has been made that it be displayed, to a space in video memory 132, where a request to display this data image has been made, whereby the image data is then displayed on the display device.

Now, cache data processing by the image displaying device of the embodiment will be specifically described.

Figure 2:
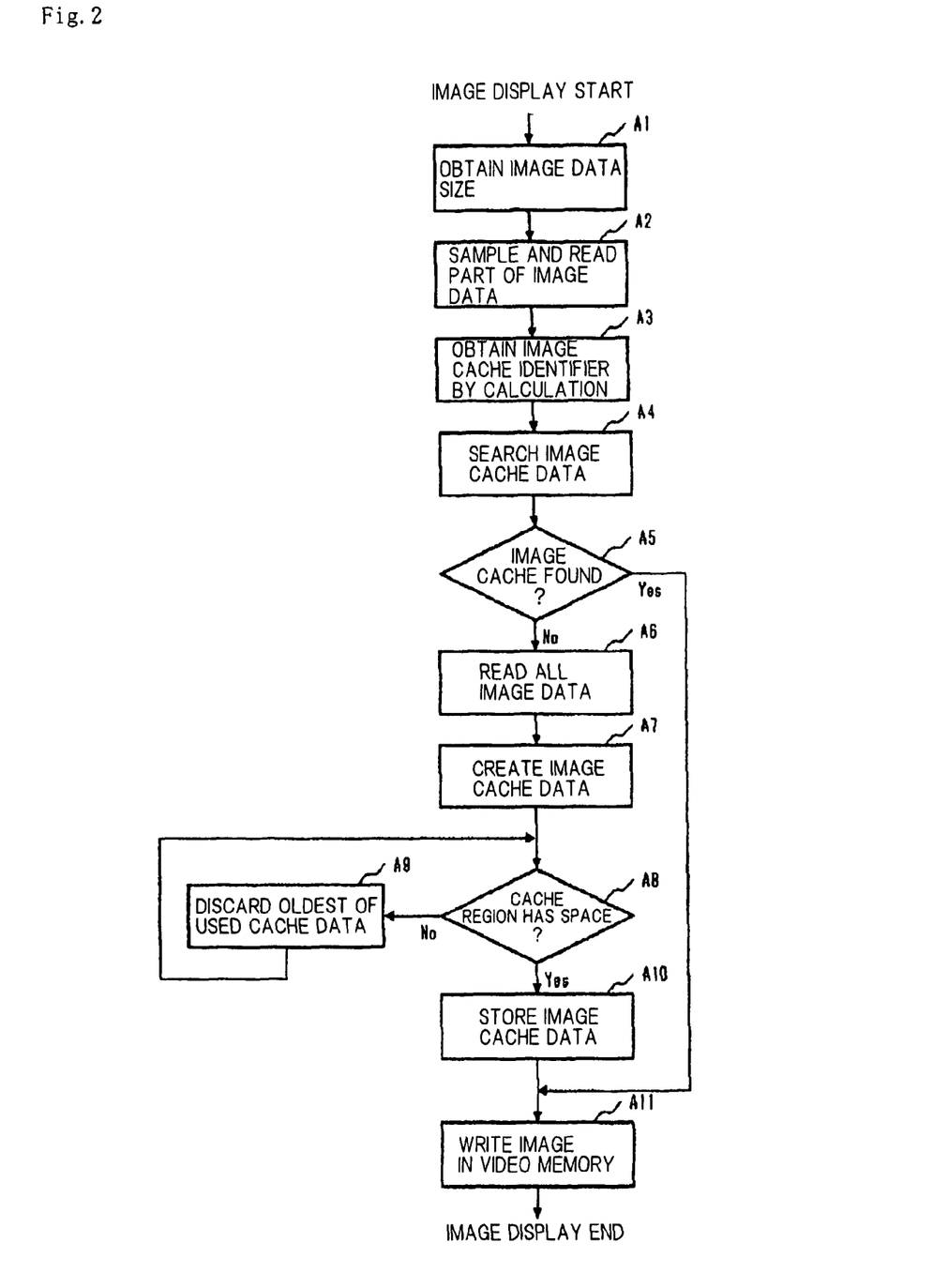
FIG. 2 is a flowchart showing a procedure for displaying an image by the image displaying device shown in FIG. 1.

FIG. 2 shows an image displaying procedure performed by image displaying device 1 shown in FIG. 1. Operations of image displaying device 1 will be specifically described with reference to FIG. 1 and FIG. 2 below.

When an operator inputs a command to indicate that the image display should be start via input unit 1, information relating to the original image data that is to be displayed (such as identifying information) is supplied from input unit 10 to image processing unit 11.

In image processing unit 11, first, image sampling reading unit 111 determines the original image data to be displayed from original image data information 121 stored in storage device 12 based on the information relating to the original image data to be displayed (such as identifying information), which is supplied from input unit 10, and obtains the size of the original image data (step A1). Then, image sampling reading unit 111 samples the original image data to be displayed at sampling positions during certain sampling intervals, which depend on the obtained data size, and reads a part of the image data (step A2).

Next, image cache identifier generating unit 113 generates a hash value of a fixed value from the sampling data of the original image data to be displayed, which is read by image sampling reading unit 111, by using a predetermined hash function, and generates an image cache identifier by adding a bit field, which indicates the image size of the original image data to be displayed, to the hash value (step A3). Then, image cache searching unit 114 searches image cache data storage unit 131 based on the image cache identifier generated by image cache identifier generating unit 113 (step A4), and checks whether cache data including the image cache identifier are there or not (step A5).

If no image cache data including the image cache identifier generated at step A3 is found in the process of step A5, image cache searching unit 114 requests image reading unit 112 to read the original image data. Then, in response to the request, image reading unit 112 reads all the original image data to be displayed from original image data information 121 stored in storage device 12 (step A6).

Image cache generating unit 115 decodes the original image data to be displayed, which is read by image reading unit 112, and generates image cache data by combining the decoded image data with the image cache identifier of the original image data to be displayed, which is generated by image cache identifier generating unit 113 at step A3 (step A7). Then, image cache generating unit 115 checks available free space of image cache data storage unit 131 and determines whether image cache data storage unit 131 can store the image cache data that is newly generated at step A7 or not (step A8).

In the process of step A8, if it is determined that image cache data storage unit 131 does not have enough available space and that the newly generated image cache data cannot be stored in image cache data storage unit 131 ("No" at step A8), image cache generating unit 115 deletes the image cache data having the oldest date and time of use from the image cache data storage unit 131 (step A9). After processing at step A9 is over, the operation returns to step A8. Processing at steps A8 and A9 is repeated until a region for storing the newly generated image cache data is reserved in image cache data storage unit 131.

In the process of step A8, if it is determined that the image cache data storage part 131 has enough available space for storing the newly generated image cache data ("Yes" at step A8), image cache generating unit 115 stores the newly generated image cache data in image cache data storage unit 131 (step A10). Then, image cache generating unit 115 supplies the newly generated image cache data for image displaying unit 116 and requests to display this data to image displaying unit 116. Image displaying unit 116 writes the image cache data, for which a request has been made that it be displayed, to a space in video memory 132 (step A11).

If image cache data including the image cache identifier generated at step A3 is found during processing at step A5, the operation proceeds to processing at step A11. In this processing at step A11, image cache searching unit 114 supplies the image cache data found during processing at step 5 to image displaying unit 116, requesting to display the image, and image displaying unit 116 writes the image cache data, for which a request has been made that it be displayed, to a space in video memory 132.

As described above, according to the image displaying device of the present embodiment, since the original image data is sampled in order to retrieve a part of the image data and a hash value is obtained by using the retrieved part of data, it can provide a shorter time to read the data and to calculate hash values and smaller amount of data to be calculated than the process in which the entire original image data is used to create an identifier of cache data. Thus, according to the present embodiment, an identifier can be generated fast.

For an external storage device using a disc-type recording medium such as a DVD, it takes a time to read all the original image data. Thus, the advantage of generating an identifier fast that is achieved by applying the present embodiment becomes more pronounced in an image displaying device that is provided with such an external storage device.

It is also effective to generate an identifier quickly in case where the original image data has high resolution and there is a large amount of data.

The present embodiment is adapted to change the sampling position for retrieving original image data (sampling position P), when sampling the original image data, according to the image data size, focusing on the fact that just a small change in original image data, prior to compression, will change the size of the coded and compressed image data. In this manner, since the sampling position of the image data that is used to obtain the hash value varies in accordance with the image size, the embodiment can cause the codes of the entire image to influence hash values even if calculation is performed with a part of the image data.

The hash value obtained in the above mentioned manner may be the same as that obtained from another image, strictly speaking in a mathematical sense. According to the present embodiment, the fixed bit length of the hash value is set enough length (for example, 128 bits) and information regarding the image size is added to the hash identifier. In this manner, since there is a limit to the memory space of image cache data storage unit 131, the number of images that can actually be cached is limited to around tens to hundreds pieces. Therefore, that actually eliminates the problem in that an identifier including a hash value generated from a partial data matches an identifier generated from another image. The reason for that will be described specifically below.

Assuming that the number of ranges of the values that can make the hash value is "n" and the number of values to be used by the hash value (the number of image caches) is "r", the combination of them, when the hash values are retrieved by the number of "r" so as not to be redundant, is given as:

$$\frac{n!}{(n-r)!}. \quad \text{[Math 1]}$$

The combination of them, when the hash values are retrieved by the number of "r" so that the hash values are redundant, is given as "$n^r$". Therefore, the probability P of retrieving the hash values by the number of "r" so as not to be redundant will be $$\begin{aligned} P &= \frac{n!}{n^r(n-r)!} \quad \text{[Math 2]} \\ &= \frac{n(n-1)(n-2)\cdots(n-r+1)}{n^r} \\ &= \frac{n}{n} \times \frac{(n-1)}{n} \times \frac{(n-2)}{n} \times \cdots \times \frac{(n-r+1)}{n} \\ &> \left\{\frac{(n-r+1)}{n}\right\}^r \end{aligned}$$

Assuming the hash value 128 bits, the number of caches is 100, $n=2^{128}$, $r=1000$, the probability P will be $$\begin{aligned} P &= \left\{\frac{(2^{128}-999)}{2^{128}}\right\}^{1000} \quad \text{[Math 3]} \\ &> \left\{\frac{(2^{128}-999)}{2^{128}}\right\}^{1000} \\ &> (0.999999999\cdots)^{1000} \text{ (30 digits or more of 9)} \\ &> 0.999999999\cdots \text{ (only three digits of 9 are reduced if the number is powered of 1000)} \end{aligned}$$

That tells that an identifier including a hash value generated from partial data actually does not match with an identifier generated from another image.

According to the present embodiment, since a part of the image data is used as an identifier for associating the image cache data and the original image data with each other as mentioned above, an image to be used for the same original image data saved under different file names can be displayed by using the same image cache data. In addition, for the same original image data that is saved in different locations, an image can be displayed by using the same cache data.

OTHER EMBODIMENT

Figure 3:
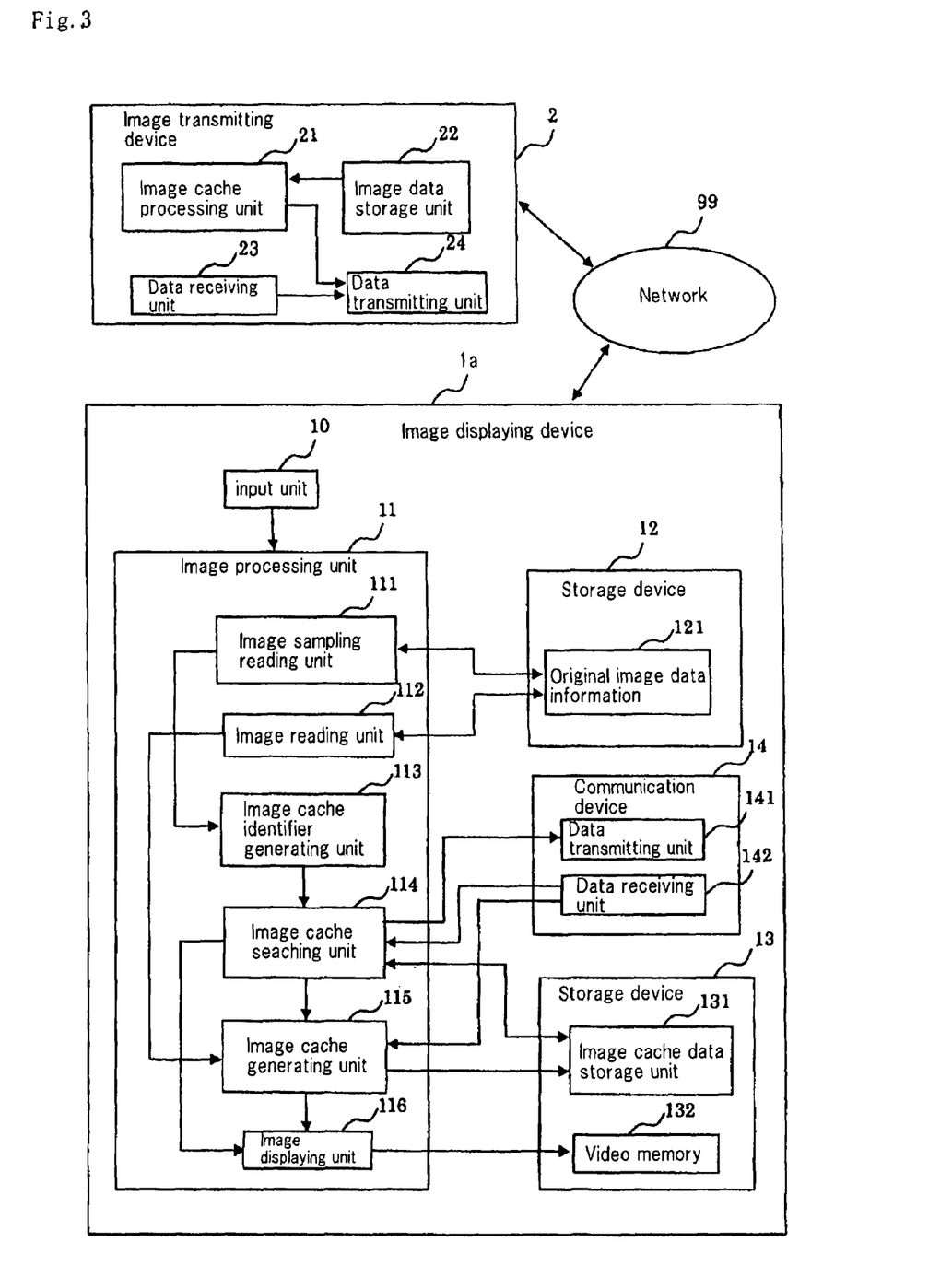
FIG. 3 is a block diagram showing a configuration of an image display system of another embodiment of the present invention.

FIG. 3 is a block diagram showing a configuration of an image displaying system of another embodiment of the present invention. With reference to FIG. 3, the image displaying system of the embodiment includes image displaying device 1a and image transmitting device 2 for mutually communicating with image displaying device 1a via network 99.

Image displaying device 1a has communication device 14 in addition to the configuration shown in FIG. 1. Communication device 14 has a communication function represented as a modem for communicating with an external information terminal mutually via network 99, including data transmitting unit 141 and data receiving unit 142. Network 99 is a network represented as a wired LAN, a wireless LAN, a Bluetooth (trademark).

Image transmitting device 2 is a terminal device with a communicating function such as a computer, a PDA, and a cell phone, and is connected to image displaying device 1a via network 99. Image transmitting device 2 includes image cache processing unit 21, image data storage unit 22, data receiving unit 23 and data transmitting unit 24.

Image data storage unit 22 is for storing information corresponding to original image data information 121 shown in FIG. 1. The original image data information stored in image data storage unit 22 also includes information such as the original image data, which is coded and compressed, represented as JPEG, for example, the data size and the original image data.

Image cache processing unit 21 performs the same processing as that of image sampling reading unit 111, image reading unit 112, image cache identifier generating unit 113 and image cache generating unit 115 shown in FIG. 1.

Although it is not shown in FIG. 3, input unit 10 as shown in FIG. 1 is provided for image transmitting device 2. The operator operates image transmitting device 2 via the input unit to input information relating to the original image data to be displayed (identifying information). If input indicating that an image is to be displayed is done, the information relating to the original image data to be displayed input by the operator (such as identifying information) is supplied from the input unit to image cache processing unit 21.

Now, operations of the image displaying system of the embodiment will be specifically described.

Figure 4:
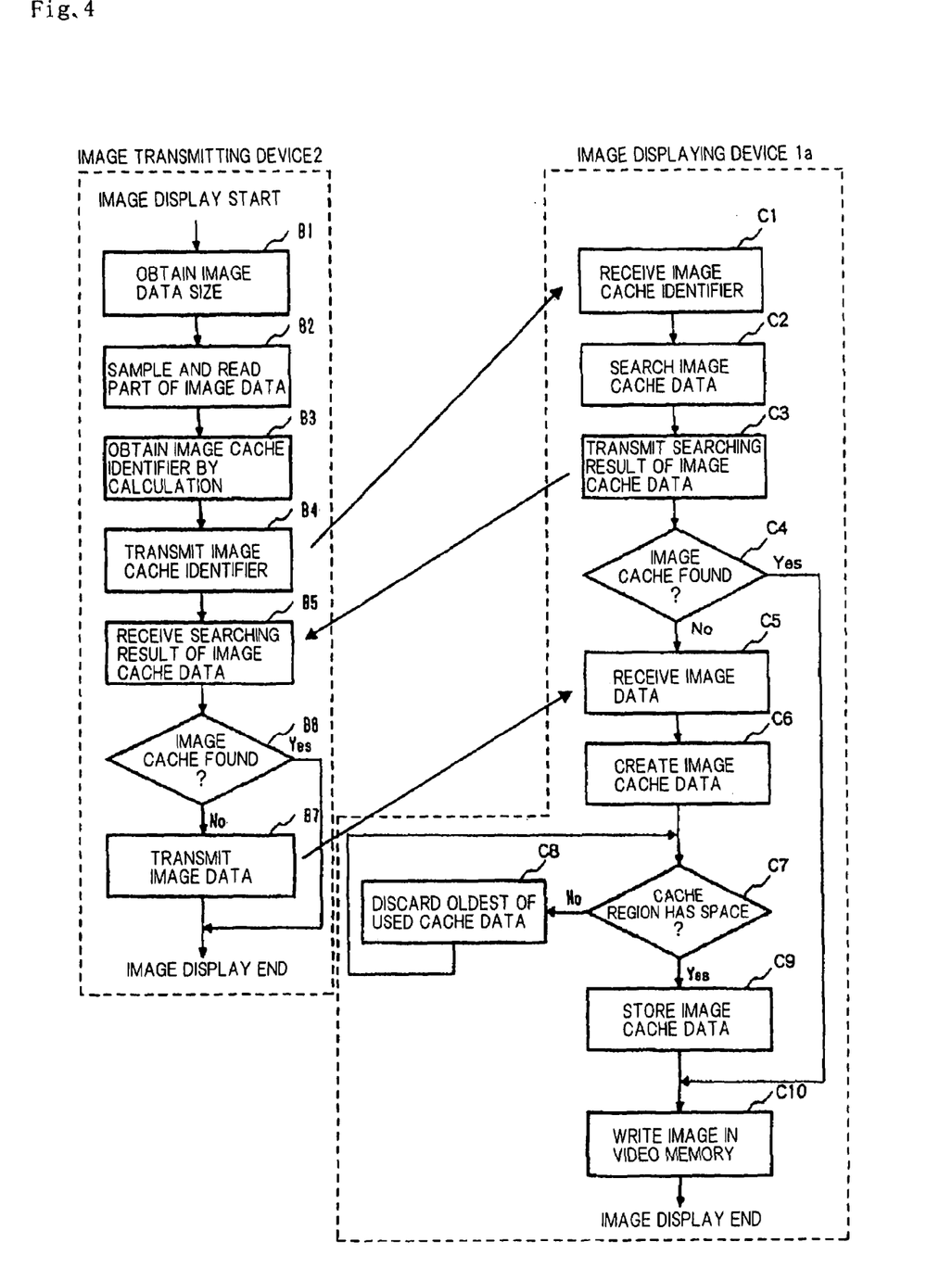
FIG. 4 is a flowchart showing a procedure for displaying an image by the image displaying device shown in FIG. 3.

FIG. 4 shows an image displaying procedure performed by the image displaying system of the embodiment. Cache data processing operations will be specifically described with reference to FIG. 3 and FIG. 4.

When an operator inputs a command by using the input unit (not shown) to start the display of images, information relating to the original image data to be displayed (such as identifying information) is supplied from the input unit to image cache processing unit 21.

Image cache processing unit 21 determines the original image data to be displayed from the original image data information stored in image data storage unit 22 based on the information relating to the original image data to be displayed (such as identifying information), which is supplied from the input unit, and obtains the size of the original image data (step B1). Then, image cache processing unit 21 samples the original image data to be displayed at sampling positions which have certain sampling intervals and which depend on the obtained data size, and reads a part of the image data (step B2).

Next, image cache processing unit 21 generates a hash value of a fixed length from the sampling data of the original image data to be displayed, which is read at step B2, by using a predetermined hash function, and generates an image cache identifier by adding a bit field, which indicates the image size of the original image data to be displayed, to the hash value (step B3). Then, image cache processing unit 21 transmits the generated image cache identifier to image displaying device 1a through data transmitting unit 24 (step B4).

The image cache identifier transmitted from image transmitting device 2 is received at data receiving unit 142 of image displaying device 1a (step C1). Data receiving unit 142 supplies the received image cache identifier to image cache searching unit 114. Image cache searching unit 114 searches image cache data storage unit 131 based on the image cache identifier supplied from data receiving unit 142 (step C2) and transmits the searched result (including information indicating the presence of the corresponding cache data) to image transmitting device 2 via data transmitting unit 141 (step C3).

If cache data including an image cache identifier is found as a result of searching ("Yes" at step C4), image cache searching unit 114 supplies the image cache data to image displaying unit 116, requesting that the image be displayed, and image displaying unit 116 writes the image cache data, which is requested to be displayed, to video memory 132 (step C10). If no cache data including the image cache identifier is found ("No" at step C4), image cache searching unit 114 enters in waiting state to receive the original image data.

The search result transmitted from data transmitting unit 141 at step C3 is received by data receiving unit 23 of image transmitting device 2 (step B5). Data receiving unit 23 supplies the received search result to image cache processing unit 21. Image cache processing unit 21 determines whether cache data including the image cache identifier transmitted at step B4 is found or not based on the search result supplied from data receiving unit 23 (step B6). If no cache data is found (No at step B6), image cache processing unit 21 reads all the original image data to be displayed from the original image data information stored in image data storage unit 22 and transmits the read original image data to image displaying device 1a via data transmitting unit 24 (step B7). If cache data is found ("Yes" at step B6), processing at image transmitting device 2 ends.

The original image data transmitted from image transmitting device 2 is received by data receiving unit 142 of image displaying device 1a (step C5). Data receiving unit 142 supplies the received original image data to image cache generating unit 115. Image cache generating unit 115 decodes the original image data supplied from data receiving unit 142, and generates image cache data by combining the decoded image data with the image cache identifier, which is transmitted at step B4 (step C6). Then, image cache generating unit 115 checks available free space of image cache data storage unit 131 and determines whether image cache data storage unit 131 can store the image cache data that is newly generated at step C6 or not (step C7).

In the process of step C7, if it is determined that image cache data storage unit 131 has not enough available space and that the newly generated image cache data cannot be stored in image cache data storage unit 131 ("No" at step C7), image cache generating unit 115 deletes the image cache data having the oldest date and time of use from image cache data storage unit 131 (step C8). After processing at step C8 is over, the operation returns to step C7. Processing at steps C7 and C8 is repeated until a region for storing the newly generated image cache data is reserved in image cache data storage unit 131.

In the process of step C7, if it is determined that image cache data storage part 131 has enough available space for storing the newly generated image cache data ("Yes" at step C7), image cache generating unit 115 stores the newly generated image cache data in image cache data storage unit 131 (step C9). Then, image cache generating unit 115 supplies the newly generated image cache data to image displaying unit 116, requesting that the image be displayed, and image displaying unit 116 writes the image cache data, for which a request has been made that it be displayed, to a space in video memory 132 (step C10).

The image displaying system of the embodiment may have a plurality of image transmitting devices such as image transmitting device 2. If each of the image transmitting devices is operated to display an image relating to the same original image data, the same image cache identifier is transmitted from each of the image transmitting devices, although, one piece of image cache data is generated from those image cache identifiers in image displaying device 1a. Therefore, a plurality of pieces of image cache data are not generated from the same original image data.

Since a part of the original image data is used to obtain a hash value, this can lead to a shorter amount of time needed to read the data and to calculate hash values and to smaller amount of data that needs to be calculated than the process in which the entire original image data is used to create an identifier of cache data. Thus, according to the embodiment, an identifier can be calculated fast.

Each embodiment described above is merely an example of the present invention, and the configuration and operation may be changed without departing from the spirit of the present invention as required.

For example, the image displaying device may perform zoom-down processing on the image cache data according to the screen resolution and the display form (such as a zoomed down list) of the image displaying device.

The image displaying device may compress and keep the image cache data. This results in a larger number of images that can be cached in the image displaying device. This increase in the number of cache images is particularly effective in such a case in which the configuration shown in FIG. 3 has a small communication band for a network, and in which the image displaying device requires a long time to receive the original image data from the image transmitting device.

In the configuration shown in FIG. 1, image cache identifier generating unit 113 may include image sampling reading unit 111 and image cache generating unit 115 may include image reading unit 112.

The present invention can be generally applied to a display device that displays image data stored in an internal storage device or an external storage device.

The present invention may also be applied to a display system in which screen display data (for example, captured screen data) on a computer is transmitted to a display device such as a projector via a wired or a wireless network and the display device displays the transmitted data.

The present invention may also be applied to a system which comprises of a plurality of computers connected via a network and which has a function in that the computer receives and displays image data from another computer which is the destination of communication.

While preferred embodiments of the present invention have been described using specific terms, such description is for illustrates purposes only, and it is to be understood that changes and variations may be made without departing from the spirit or scope of the following claims.

What is claimed is:

1. An image displaying device having an image cache memory, said image displaying device comprising:
   an image displaying unit that performs a process for displaying supplied image data;
   an image cache identifier generating unit that obtains a hash value of a fixed length from sampling data of original image data and that generates an image cache identifier unique to said original image data based on the hash value of the fixed length, said sampling data being obtained by sampling an entirety of the original image data at regular intervals which are determined based on a data size of the original image data;
   an image cache searching unit that, when the image cache identifier is generated by said image cache identifier generating unit, checks whether image cache data to which the image cache identifier is added is stored in said image cache memory, and that reads the image cache data from said image cache memory when the image cache data is stored and supplies the read image cache data for said image displaying unit; and
   an image cache generating unit that, when said image cache searching unit determines that the image cache data has not been stored in said image cache memory, supplies the original image data for said image displaying unit, and that generates image cache data by adding the image cache identifier generated by said image cache identifier generating unit to the original image data and stores the image cache data in said image cache memory.

2. The image displaying device according to claim 1, wherein said image cache identifier generating unit generates the image cache identifier by adding information indicating the data size of the original image data to the hash value of the fixed length obtained from the sampling data of the original image data.

3. The image displaying device according to claim 2, wherein said image cache identifier generating unit changes a position for sampling the original image data according to the data size of the original image data.

4. The image displaying device according to claim 1, further comprising:
   an input unit that can input information; and
   an information storage unit in which a plurality of pieces of compressed image data having an arbitrary data size are stored as the original image data,
   wherein, when said image cache identifier generating unit receives input indicating that compressed image data that is specified among the plurality of pieces of compressed image data via said input unit is to be displayed, said image cache identifier generating unit samples the specified compressed image data from said information storage unit, and generates an image cache identifier unique to the specified compressed image data based on the hash value of the fixed length, and
   wherein said image cache searching unit checks whether the image cache data of the specified compressed image data is stored in said image cache memory based on the image cache identifier generated by said image cache identifier generating unit, and if the image cache data is stored, supplies the image cache data for said image displaying unit.

5. The image displaying device according to claim 4, wherein, when said image cache searching unit determines that the image cache data of the specified compressed image data has not been stored in said image cache memory, said image cache generating unit reads the specified compressed image data from said information storage unit and supplies the specified compressed image data for said image displaying unit, while generating the image cache data by adding the image cache identifier of the specified compressed image data, which is generated by said image cache identifier generating unit, to the read image compressed image data, and storing the image cache data in said image cache memory.

6. The image displaying device according to claim 1, wherein a period of said sampling data depends upon the entirety of said original image data.

7. The image displaying device according to claim 1, wherein said sampling data is obtained irrespective of a data size of the supplied image data.

8. The image displaying device according to claim 1, wherein the hash value of the fixed length is calculated based on the entirety of said original image data.

9. The image displaying device according to claim 1, wherein the image cache identifier generating unit obtains the hash value of the fixed length based on a predetermined hash function.

10. The image displaying device according to claim 1, wherein the image cache identifier generating unit generates the image cache identifier by adding a bit field to the hash value of the fixed length.

11. The image displaying device according to claim 1, wherein a part of the supplied image data is used as an identifier for associating the image cache identifier with the original image data.

12. The image displaying device according to claim 1, wherein the image cache identifier is independent of information relating to a storage location of the original image data.

13. An image displaying system, comprising:
an image displaying device having an image cache memory; and
at least one image transmitting device that communicates with said image displaying device mutually,
wherein said image transmitting device includes an image cache processing unit that obtains a hash value of a fixed length from sampling data of original image data, generates an image cache identifier unique to said original image data based on the hash value of the fixed length and transmits the image cache identifier to said image displaying device, said sampling data being obtained by sampling an entirety of the original image data at regular intervals which are determined based on a data size of the original image data,
wherein said image displaying device comprises:
an image displaying unit that performs a process for displaying supplied image data;
an image cache searching unit that receives the image cache identifier from said image transmitting device and checks whether image cache data, to which the received image cache identifier is added, is stored in said image cache memory or not; and
an image cache generating unit that, when said image cache searching unit determines that the image cache data has not been stored in said image cache memory, obtains the original image data from said image transmitting device and supplies the obtained original image data for said image displaying unit,
wherein said image cache searching unit reads the image cache data from said image cache memory when the image cache data has been stored in said image cache memory and supplies the read image cache data for said image displaying unit, and
wherein said image cache generating unit generates the image cache data by adding the image cache identifier received from said image transmitting device to the obtained original image data and stores the image cache data in said image cache memory.

14. The image displaying system according to claim 13, wherein said image cache processing unit generates the image cache identifier by adding information, that indicates the data size of the original image data, to the hash value of the fixed length obtained from the sampling data of the original image data.

15. The image displaying system according to claim 14, wherein said image cache processing unit changes a position for sampling the original image data according to the data size of the original image data.

16. The image displaying system according to claim 13, wherein said image transmitting device further comprises:
an input unit that can input information; and
an information storage unit in which a plurality of pieces of compressed image data having an arbitrary data size are stored as said original image data,
wherein when said image cache processing unit receives input indicating that compressed image data that is specified among the plurality of pieces of compressed image data via said input unit is to be displayed, said image cache processing unit samples the specified compressed image data from said information storage unit, and generates an image cache identifier unique to the specified compressed image data based on the hash value of the fixed length, and
wherein said image cache searching unit checks whether the image cache data of the specified compressed image, data is stored in said image cache memory based on the image cache identifier generated by said image cache processing unit, and if the image cache data is stored, supplies the image cache data for said image displaying unit.

17. The image displaying system according to claim 16, wherein when said image cache searching unit determines that the image cache data of the specified compressed image data has not been stored in said image cache memory, said image cache searching unit sends a search result indicating the determination to said image transmitting device,
wherein, when said image cache processing unit receives the search result from said image displaying device, said image cache processing unit reads the specified compressed image data from said information storage unit and transmits the specified compressed image data to said image displaying device, and
wherein said image cache generating unit supplies the specified compressed image data received from said image transmitting device for said image displaying unit, generates the image cache data by adding the image cache identifier of the specified compressed image data, which is generated by said image cache processing unit, to the received image compressed image data and stores the image cache data to said image cache memory.

18. An image displaying method of an image displaying device having an image cache memory, said method comprising:
obtaining a hash value of a fixed length from sampling data of original image data, said sampling data being obtained by sampling an entirety of the original image data at regular intervals which are determined based on a data size of the original image data;
generating an image cache identifier unique to the original image data based on the hash value of the fixed length;
determining whether image cache data to which the image cache identifier is added is stored in said image cache memory;
displaying the image cache data when the image cache data is stored in said image cache memory; and
displaying the original image data and generating the image cache data by adding the generated image cache identifier to the original image data and then storing the image cache data in said image cache memory when the image cache data is not stored in said image cache memory.

19. An image displaying device having an image cache memory, said image displaying device comprising:
an image displaying means for performing a process for displaying supplied image data;
an image cache identifier generating means for obtaining a hash value of a fixed length from sampling data of original image data and generating an image cache identifier unique to said original image data based on the hash value of the fixed length, said sampling data being obtained by sampling an entirety of the original image data at regular intervals which are determined based on a data size of the original image data;

an image cache searching means for, when the image cache identifier is generated by said image cache identifier generating unit, checking whether image cache data, to which the image cache identifier is added, is stored in said image cache memory or not, reading the image cache data from said image cache memory when the image cache data is stored and supplying the read image cache data for said image displaying unit; and an image cache generating means for, when said image cache searching unit determines that the image cache data has not been stored in said image cache memory, supplying the original image data for said image displaying unit, generating the image cache data by adding the image cache identifier generated by said image cache identifier generating unit to the original image data and storing the image cache data in said image cache memory.

20. An image displaying method of an image displaying device having an image cache memory, said method comprising:

obtaining a hash value of a fixed length from sampling data of original image data, said sampling data being obtained by sampling an entirety of the original image data at regular intervals which are determined based on a data size of the original image data;

generating an image cache identifier unique to said original image data based on the hash value of a fixed length;

checking whether image cache data with the image cache identifier added is stored in said image cache memory;

displaying said image cache data, if said image cache data is stored in said image cache memory; and displaying said original image data, while generating said image cache data by adding said generated image cache identifier to said original image data and storing the image cache data in said image cache memory, if said image cache data is not stored in said image cache memory.

* * * * *